Patented June 20, 1950

2,512,180

UNITED STATES PATENT OFFICE 2,512,180

1-(P-CHLOROPHENYL)-2-PYRIDYLACETYL-ENES AND 1-(P-CHLOROPHENYL)-2-QUINOLYLACETYLENES

James M. Smith, Jr., North Plainfield, N. J., assignor to American Cyanamid Company, New York, N. Y., a corporation of Maine No Drawing. Application January 31, 1947, Serial No. 725,733

4 Claims. (Cl. 260—283)

This invention relates to new organic compounds and to methods of preparing the same. The application is a continuation-in-part of my application Serial No. 598,627, filed June 9, 1945, now Patent No. 2,442,865, issued June 8, 1948.

The new compounds of the present invention have the following general formula:

in which R is a radical of the group consisting of pyridine, benzopyridine and alkylpyridine radicals and R' is a halogenated aryl radical.

These new halogenated products are useful as insecticides and as intermediates in the preparation of analgesics and other useful organic compounds.

The new compounds of the present invention may be prepared by heating a compound of the formula

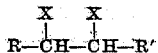

in which the X's represent halogen radicals and R and R' are as defined above.

As illustrated by the particular reactants of Example 1, the process of dehalogenation most likely takes place as follows:

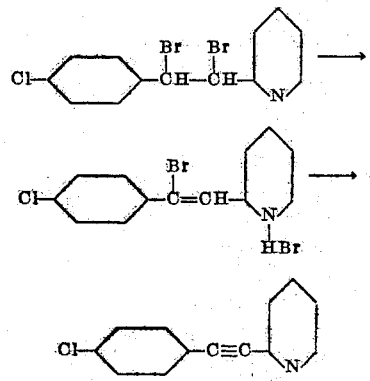

As illustrated above, the 1,2-dibromo-1-(p-chlorophenyl)-2-(pyridyl)ethane first loses one of the halogens of the ethane group, after which the second halogen is removed to obtain the acetylene derivatives of the present invention. As will be obvious, the starting material may be the 1 or 2 monohalo ethylene derivative which may be prepared and used as such. Example II illustrates this latter variation.

The removal of the first halogen, when the starting material has two halogens on the ethane part of the molecule, is accomplished very easily by merely heating the dihalogen within the range 50° to 150° C. for fifteen minutes to about three hours. The second halogen is removed with greater difficulty by heating within the range 50° to 100° C., preferably 75° to 85° C., under substantially anhydrous conditions in the presence of at least a slight molar excess of an alkali metal hydroxide. The dehalogenation is preferably conducted with the starting material dissolved or suspended in a solvent such as 95% ethanol or the like. The heating period may require between 15 minutes and three hours. Obviously, when starting with the dihaloethane, the removal of both halogens may take place in the same solvent and during the same heating period.

As stated above, the starting material may be either the 1- or 2-halo-1 (halophenyl)-2-(pyridyl) ethylene or the corresponding 1,2-dihaloethane, and may be in the form of one of the acid salts or as the free base. Suitable starting materials include 1-(p-chlorophenyl)-2-(2-pyridyl)-1,2-dibromoethane; 1-(p-chlorophenyl)-2-(2-pyridyl)-1,2-dichloroethane; 1-(p-bromophenyl)-2-(2-pyridyl)-1,2-dibromoethane; 1-(o-chlorophenyl)-2-(2-pyridyl)-1,2-dibromoethane; 1-(p-chlorophenyl)-2-4-pyridyl)-1,2-dibromoethane; 1-(p-chlorophenyl)-2-(2-quinolyl)-1,2-dibromoethane; 1-(p-chlorophenyl)-2-(2-(6-methylpyridyl))-1,2-dibromoethane; 1-(p-chlorophenyl)-2-(2-pyridyl)-1-bromoethylene; 1-(p-chlorophenyl)-2-(2-pyridyl)-1-chloroethylene; 1-(p-chlorophenyl)-2-(2-pyridyl)-2-bromoethylene; 1-(dichlorophenyl)-2-(4-pyridyl)-1-chloroethylene; 1-(p-fluorophenyl)-2-(2-pyridyl)-1,2-dibromoethane; and still others including also the acid salts of the above.

To illustrate the invention in greater detail the following examples are given. In these representative compounds of the present invention are prepared. Inasmuch as the starting materials likewise appear to be new, description of the preparation thereof from known compounds in included. All parts are by weight unless otherwise indicated.

Example I

A mixture of 1,500 parts of p-chlorobenzaldehyde, 990 parts of alpha-picoline, and 1,088 parts of acetic anhydride are heated under reflux in an atmosphere of nitrogen for 18 hours. Low-boiling products and unreacted ingredients are then removed by vacuum distillation until approximately 1,500 parts of distillate are obtained. The residue is poured into several volumes of cold water, resulting in the precipitation of a brown crystalline solid which is isolated by filtration. This is dissolved in an excess of 2 N hydrochloric acid and extracted with ether or other organic solvent, such as benzene, to remove impurities. The acid solution is then neutralized with caustic, and the resultant precipitate filtered off, washed with water, and dried. The yield of crude 1-(p-chlorophenyl)-2-(2-pyridyl)ethylene is approximately 1,245 parts. Purification of the product may be accomplished by recrystallization of the base or its hydrochloride from a suitable organic solvent such as alcohol with the aid of decolorizing charcoal, or by vacuum distillation of the base, which boils at 173–180° C./5–7 mm. The purified base melts at 83–84° C., and the hydrochloride melts at 193–195° C.

To a solution of 550 parts of crude 1-(p-chlorophenyl)-2(2-pyridyl)ethylene in 2,850 parts of chloroform at 60° C. is added a solution of 408 parts of bromine in 600 parts of chloroform over approximately an hour's time. Refluxing is continued for an additional half hour, and the mixture is then allowed to stand overnight at room temperature. A white precipitate forms slowly, which is filtered off the next day after cooling the reaction mixture in an ice bath. Approximately 680 parts of 1,2-dibromo-1-(p-chlorophenyl)-2-(2-pyridyl)ethane is obtained, which melts at 174–175° C. An additional 125 parts of product can be obtained by distilling off part of the chloroform from the mother liquor, yielding a dark brown solid which can be purified by recrystallization from chloroform or other organic solvent. A hydrochloride of the base can be prepared by the addition of alcoholic HCl to a solution of the base in alcohol. This melts at 183–184° C.

To a solution of 658 parts of potassium hydroxide (86% real) in 3,950 parts of alcohol is added 1,263 parts of 1,2-dibromo-1-(p-chlorophenyl)-2-(2-pyridyl)ethane. This mixture is heated under reflux for one hour, and then filtered hot from potassium bromide. The filtrate is then cooled in an ice bath, resulting in the formation of a crystalline precipitate, which is filtered off, washed with cold alcohol, and dried at 45° C. This represents approximately 282 parts of 1-(p-chlorophenyl)-2-(2-pyridyl)acetylene with a crude melting point of 98.6–100° C. The addition of several volumes of water to the mother liquor results in the precipitation of 400 parts of a light tan solid which melts at 50–80° C. On recrystallization of this material from alcohol, approximately 100 additional parts of 1-(p-chlorophenyl)-2-(2-pyridyl)acetylene can be obtained. The purified base melts at 99–100.5° C.

Example II

A mixture of 600 parts of p-chlorobenzaldehyde, 396 parts of gamma-picoline, and 435 parts of acetic anhydride are heated to refluxing in an atmosphere of nitrogen for six hours. On cooling, a crystalline mass is formed, which is drowned in several volumes of water and filtered. The press cake is dissolved in an excess of warm dilute hydrochloric acid and filtered from a small amount of insoluble material. On cooling to 10° C. a heavy precipitate is formed, which is filtered off and then slurried in acetone to remove dark colored impurities. On refiltering and drying, approximately 671 parts of 1-(p-chlorophenyl)-2-(4-pyridyl)ethylene hydrochloride is obtained, which is a yellow product melting at 248–249–250° C. The free base, prepared by neutralizing an aqueous solution of the hydrochloride with caustic, melts at approximately 110° C.

To a solution of ten parts of 1-(p-chlorophenyl)-2-(4-pyridyl)ethylene in 52.5 parts of glacial acetic acid at room temperature is added a solution of 7.44 parts of bromine in 10 parts of glacial acetic acid over a half hour period. A thick orange precipitate is formed immediately. The mixture is then heated to refluxing, giving momentary complete solution followed by reprecipitation, and held there for 1.5 hours, after which it is allowed to stand overnight. Upon filtering and drying, approximately 16.5 parts of a product which probably is 1-(p-chlorophenyl)-(1- or 2-bromo)-2-(4-pyridyl)ethylene hydrobromide is obtained, which melts with decomposition at 275–280° C.

To a solution of 3.9 parts of potassium hydroxide in 24 parts of alcohol is added 7.5 parts of 1-(p-chlorophenyl)-(1- or 2-bromo)-2-(4-pyridyl)ethylene hydrobromide. The mixture is refluxed for 1.5 hours and filtered hot from potassium bromide. Upon cooling to 0° C., a crystalline precipitate of 1-(p-chlorophenyl)-2-(4-pyridyl)-acetylene is formed, which upon recrystallization from alcohol melts at 119.5–122° C.

Example III

A mixture of 760 parts quinaldine (95% Reilly Tar and Chemical Co.), 530 parts p-chlorobenzaldehyde, and 357 parts acetic anhydride are boiled under reflux for 2.5 hours under an atmosphere of nitrogen. The solution is allowed to cool, whereupon it solidifies. After 16 hours it is melted and poured into ice and water to give about 4,000 parts total volume. The crude product is collected on the filter and washed free of acid. It is then extracted with 6,300 parts of boiling alcohol containing a little activated carbon. The alcohol extract on filtering and cooling deposits a yellow crystalline product which is collected on the filter, washed with alcohol and dried. The filtrate and washings are used to extract the crude residue three times more in a similar way. The total recovery is 654 parts. For analysis a small sample of this material was recrystallized from boiling alcohol; it then melted at 142.8–143.2° C.

A mixture of 26.6 parts of 2-(p-chlorostyryl)-quinoline and 222 parts of o-dichlorobenzene is heated to 50° C. until complete solution occurs. It is then cooled to 25° C. and 17 parts of bromine in 46 parts of o-dichlorobenzene is added; the temperature is raised to 180–190° C. and the solution boiled under reflux for two hours. It is then cooled and the precipitate is collected on the filter, washed with o-dichlorobenzene and ether and dried. The yield is 30 parts melting at 199–199.9° C.

Five parts of the brominated product above is treated with 5 parts of potassium hydroxide in 24 parts of alcohol at the boil for one hour. The mixture is filtered hot and the filtrate cooled to give 1 part of 1-(p-chlorophenyl)-2-(2-quinolyl)-acetylene, a light brown product melting at 137–137.5° C.

A similar treatment of dibromo-4-styrylquinoline hydrochloride with hot alcohol and potassium hydroxide to yield phenyl-4-quinolylacetylene is disclosed in Example 4 of my Patent No. 2,414,398 issued January 14, 1947.

I claim:
1. Compounds having the general formula

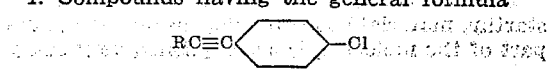

in which R is a radical of the group consisting of the pyridine, alkyl pyridine, and benzopyridine radicals.

2. 1-(p-chlorophenyl)-2-(2-pyridyl)acetylene.
3. 1-(p-chlorophenyl)-2-(4-pyridyl)acetylene.
4. 1-(p-chlorophenyl)-2-(2-quinolyl)acetylene.

JAMES M. SMITH, JR.

REFERENCES CITED

The following references are of record in the file of this patent:

UNITED STATES PATENTS

| Number | Name | Date |
|---|---|---|
| 2,358,925 | Haller et al. | Sept. 26, 1944 |
| 2,442,865 | Smith | June 8, 1948 |

FOREIGN PATENTS

| Number | Country | Date |
|---|---|---|
| 594,849 | Germany | Mar. 22, 1934 |

OTHER REFERENCES

Baurath, Berichte, vol. 20, pp. 2719–2720 (1887).
Baurath, Berichte, vol. 21, pp. 818–825 (1888).
Bachman et al., J. Am. Chem. Soc., vol. 57, pp. 1284–1287 (1935).
Ruggli et al., Helv. Chim. acta, vol. 21, pp. 38–50 (1938).
Organic Syntheses, vol. 22 (John Wiley, New York, 1942), pp. 50–51.
Beilstein, "Handbuch der organischen Chemie," vol. 20, p. 492.